(12) United States Patent
Lin et al.

(10) Patent No.: US 8,791,980 B2
(45) Date of Patent: Jul. 29, 2014

(54) CONTROLLING CPU USAGE TO BALANCE FAST AND SLOW DEVICES

(75) Inventors: Yishu Lin, Beijing (CN); Gregory Dorso, San Jose, CA (US); Yixin Yang, Beijing (CN); Haim Vaisburd, Redwood City, CA (US); Yuxin Liu, Cupertino, CA (US); Xu Liu, Cupertino, CA (US)

(73) Assignee: TangoMe, Inc., Mountain View, CA (US)

( * ) Notice: Subject to any disclaimer, the term of this patent is extended or adjusted under 35 U.S.C. 154(b) by 238 days.

(21) Appl. No.: 13/488,985

(22) Filed: Jun. 5, 2012

(65) Prior Publication Data

US 2013/0321555 A1 Dec. 5, 2013

(51) Int. Cl.
*H04N 7/14* (2006.01)
(52) U.S. Cl.
CPC .......................................... *H04N 7/14* (2013.01)
USPC ................... 348/14.02; 348/14.01; 348/14.12
(58) Field of Classification Search
CPC ......... H04N 7/14; H04N 7/141; H04N 7/142; H04N 7/144; H04N 7/147; H04N 7/148; H04N 7/15
USPC .............................. 348/14.01–14.16; 709/204
See application file for complete search history.

(56) References Cited

U.S. PATENT DOCUMENTS

| | | | |
|---|---|---|---|
| 7,543,106 B2 | 6/2009 | Choi | |
| 8,347,028 B2 | 1/2013 | Shitomi et al. | |
| 8,364,893 B2 | 1/2013 | Daikokuya et al. | |
| 2007/0106838 A1 | 5/2007 | Choi | |
| 2009/0063769 A1 | 3/2009 | Daikokuya et al. | |
| 2009/0144779 A1* | 6/2009 | Wan et al. | 725/62 |
| 2010/0027417 A1* | 2/2010 | Franceschini et al. | 370/232 |
| 2010/0169508 A1 | 7/2010 | Jung et al. | |
| 2011/0138136 A1 | 6/2011 | Shitomi et al. | |

OTHER PUBLICATIONS

"International Search Report PCT/2013/044160", 7 Pages, Jul. 1, 2013.

* cited by examiner

*Primary Examiner* — Melur Ramakrishnaiah

(57) ABSTRACT

A system for enabling communication between devices is described. The system includes the following: a media processing information receiver configured for receiving, at a first device, media processing information associated with a second device, wherein at least one of the first and second device is a mobile device; a comparer configured for comparing the media processing information to a processing time of the at least one media processing component of the first device; a target adjustment level determiner configured for determining a target adjustment level, wherein arriving at the target adjustment level enables the first and second device to achieve a matching media processing quality level; and a media processing component adjuster coupled with the computer and configured for adjusting the at least one media processing component of the first device to meet the target adjustment level.

23 Claims, 4 Drawing Sheets

400

```
┌─────────────────────────────────────────────────────────────────────────┐
│ RECEIVE, AT A FIRST DEVICE, MEDIA PROCESSING INFORMATION ASSOCIATED     │
│ WITH A SECOND DEVICE, WHEREIN AT LEAST ONE OF THE FIRST AND SECOND      │
│                     DEVICES IS A MOBILE DEVICE                          │
│                                 405                                     │
└─────────────────────────────────────────────────────────────────────────┘
                                    ↓
┌─────────────────────────────────────────────────────────────────────────┐
│   COMPARE THE MEDIA PROCESSING INFORMATION TO A PROCESSING TIME OF      │
│     AT LEAST ONE MEDIA PROCESSING COMPONENT OF THE FIRST DEVICE         │
│                                 410                                     │
└─────────────────────────────────────────────────────────────────────────┘
                                    ↓
┌─────────────────────────────────────────────────────────────────────────┐
│   BASED ON THE COMPARING, DETERMINE A TARGET ADJUSTMENT LEVEL,          │
│  WHEREIN ARRIVING AT THE TARGET ADJUSTMENT LEVEL ENABLES THE FIRST      │
│      DEVICE AND THE SECOND DEVICE TO ACHIEVE A MATCHING MEDIA           │
│                       PROCESSING QUALITY LEVEL                          │
│                                 415                                     │
└─────────────────────────────────────────────────────────────────────────┘

┌─────────────────────────────────────────────────────────────────────────┐
│    ADJUST THE AT LEAST ONE MEDIA PROCESSING COMPONENT TO MEET THE       │
│                       TARGET ADJUSTMENT LEVEL                           │
│                                 420                                     │
└─────────────────────────────────────────────────────────────────────────┘

┌─────────────────────────────────────────────────────────────────────────┐
│              STORE ADJUSTMENT INFORMATION HISTORY; AND                  │
│   UTILIZE STORED ADJUSTMENT INFORMATION HISTORY TO AUTOMATICALLY        │
│    ARRIVE AT THE TARGET ADJUSTMENT LEVEL DURING COMMUNICATION           │
│             BETWEEN THE FIRST DEVICE AND THE SECOND DEVICE              │
│                                 425                                     │
└─────────────────────────────────────────────────────────────────────────┘

┌─────────────────────────────────────────────────────────────────────────┐
│ BASED ON THE COMPARING, REQUEST OF THE SECOND DEVICE A CHANGE IN AT     │
│    LEAST ONE MEDIA PROCESSING COMPONENT OF THE SECOND DEVICE            │
│                                 430                                     │
└─────────────────────────────────────────────────────────────────────────┘
```

FIG. 4

CONTROLLING CPU USAGE TO BALANCE FAST AND SLOW DEVICES

FIELD OF THE INVENTION

The present technology relates generally to the video conferencing.

BACKGROUND

Presently, mobile devices are prevalently used in society. While mobile device technology continues to advance, there still exists a great communication capability gap between slow (weak) and fast (strong) mobile devices. The fast mobile device may be considered to be a strong mobile device, while the slow mobile device may be considered to be a weak mobile device. Thus, two strong mobile devices communicating with each other will experience a high quality of audio and video communication. In contrast, a weak mobile device receiving HD audio/video from a strong mobile device will experience a low quality of audio and video communication. As suggested, there exists a great disparity among devices, due to the different capability of devices resulting from age and/or a predetermined sophistication. For example, a brand new mobile device that includes up-to-date technology might not be able to communicate sufficiently with a 7 years old mobile device. Thus, there exist many communication problems due to the current disparity inherent to various mobile devices.

DESCRIPTION OF EMBODIMENTS

FIG. 4 shows a flow chart for performing a method for enabling communication between mobile devices, in accordance with an embodiment.

Figure 1:
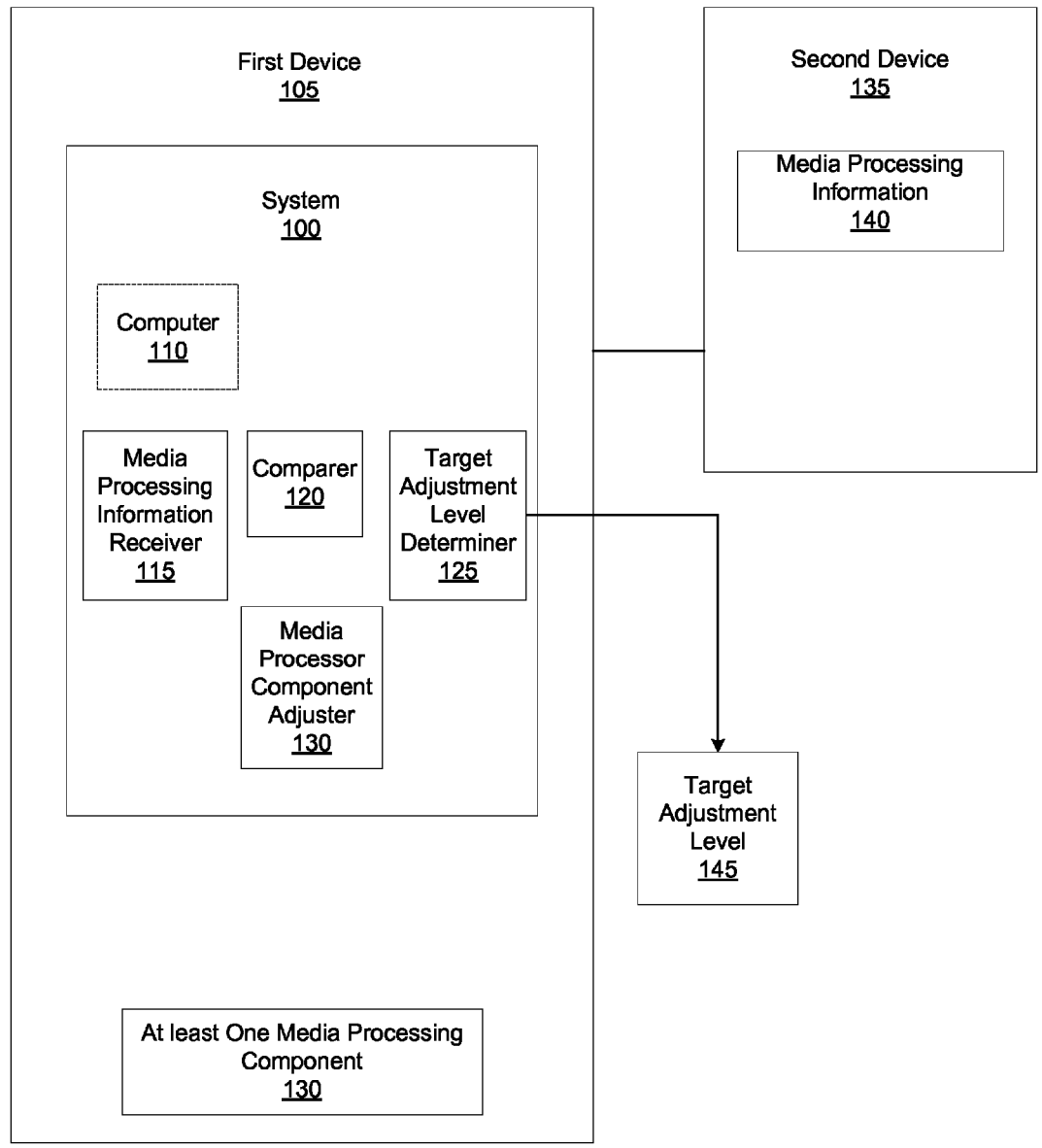
FIG. 1 shows a block diagram of a system for enabling communication between mobile devices, in accordance with an embodiment.

The drawings referred to in this description should not be understood as being drawn to scale unless specifically noted.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope. Furthermore, in the following description, numerous specific details are set forth in order to provide a thorough understanding of the subject matter. However, some embodiments may be practiced without these specific details. In other instances, well-known structures and components have not been described in detail as not to unnecessarily obscure aspects of the subject matter.

OVERVIEW OF DISCUSSION

Herein, various embodiments of a system and method for enabling communication between mobile devices are described. The description begins with a brief general discussion of mobile devices as well as embodiments. This general discussion provides a framework of understanding for a more particularized description which follows, focusing on particular features and concepts of operation associated with one or more embodiments of the described technology.

Before the mobile video calling era, calls between personal computers had a common baseline (e.g. Pentium CPU with MMX/SSE instructions, hardware echo canceller, wide band audio codec). However, these baseline functions were not available on mobile devices. Regardless, mobile devices had no need for these types of baseline functions, that is, until mobile devices became strong enough to provide multimedia interactions amongst each other.

Real time video calls across various mobile/desktop platforms as well as across various mobile devices require the optimization of balancing the CPU usage between the caller and the callee (a first and second device, respectively). Various real-time media applications have targeted joint rate-distortion optimization, or further joint rate-distortion-CPU optimization.

Embodiments not only minimize the local CPU usage according to a certain combination of constraints of audio/video quality, network bandwidth, and end-to-end delay, but embodiments also balance the CPU usage capability of a peer to the video/audio call. For example, when a high end device (fast device) makes a call to a low end device (slow device), the audio/video capture, preprocessing and encoding setup of the high end device as a sender of the audio/video considers the capability of the receiver's (peer) audio/video decoding, post-processing and rendering. Meanwhile, the peer itself acts as a sender in 2-way videos. In general, for either end in a video call (either the sender or receiver end), if the device imposes too much CPU load, the device may weaken its processing capability as a receiver.

Embodiments impose a target optimization function-balancing both the CPU usage of the two devices involved in an end-to-end video call so that the balance converges to the same or the adjacent level of audio/video qualities (subject to the CPU constraints of both of the devices). More particularly, the audio/video qualities are quantified by levels containing a pair of values. The pair of values includes, but is not limited to, the video frame rate, resolution, audio sampling rate, compression level. The selection of a combination of values comprising the level is a result of empirical data describing the best user experience. For example, with regard to video calls, empirical data shows that temporal fluidity has a higher value than spatial resolution and audio, as opposed to video, always produces more tangible experiences for the user.

In a very generalized example of the operation of an embodiment, assume that a slow device has a maximum of a five frames per second (FPS) send rate and a fast device functions at fifty FPS. When the fast device begins to receive a signal from the slow device, the fast device observes that the content is encoded at five FPS. The fast device then slows its transmission down to the rate of five FPS when communicating with the slow device. In another embodiment, the slow device may request that the fast device sends content at a rate of five FPS.

Figure 2:
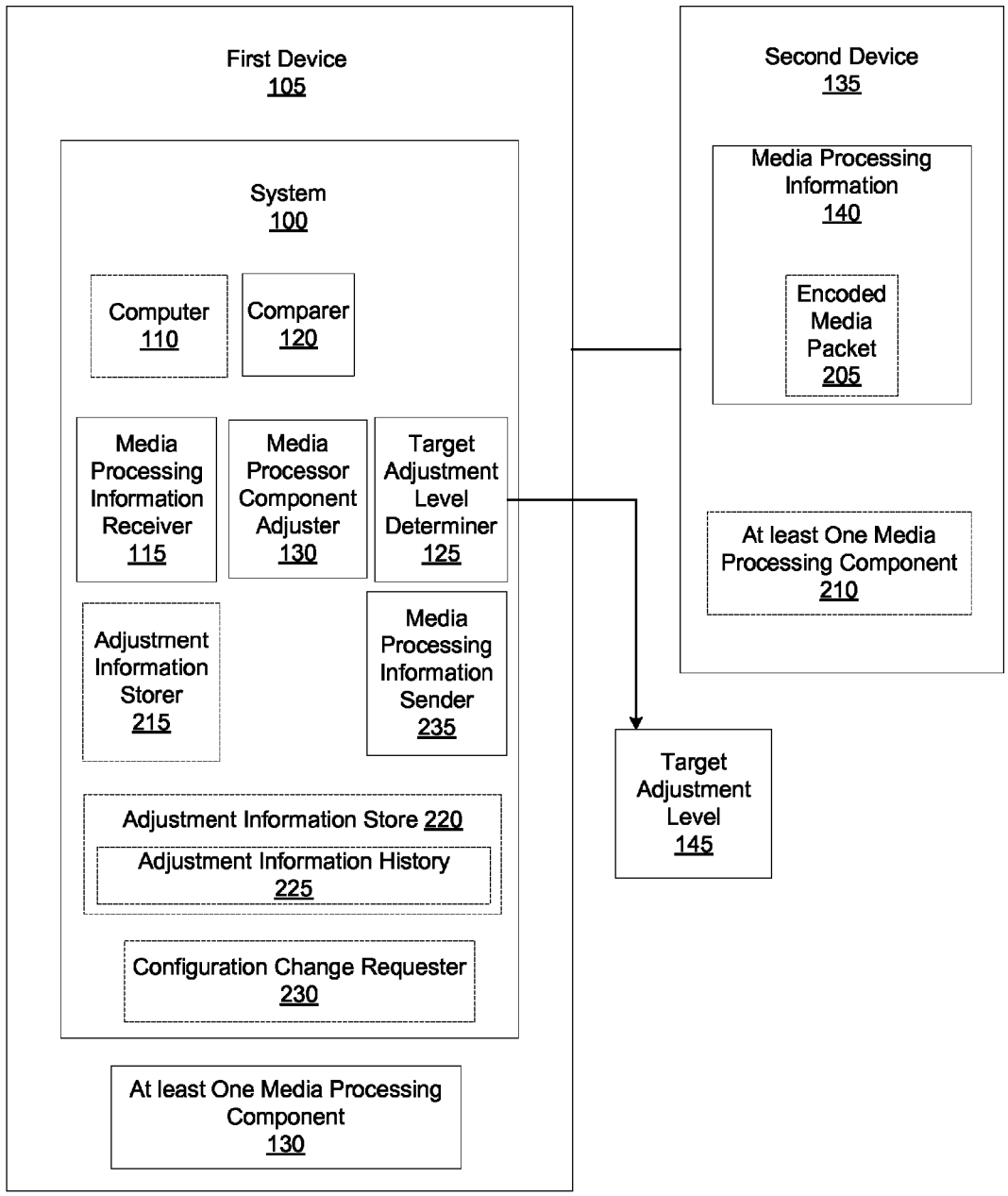
FIG. 2 shows a block diagram of a system for enabling communication between mobile devices, in accordance with an embodiment.

FIGS. 1 and 2 show a block diagram of a system 100 for enabling communication between devices, according to an embodiment. The system 100 includes the following components coupled with a computer 110: a media processing information receiver 115; a comparer 120; a target adjustment level determiner 125; and media processing component adjuster 130. The system 100 optionally includes the following components coupled with the computer 110: a media processing information receiver sender 235; an adjustment information storer 215; an adjustment information store 220; and a configuration change requester 230. It should be appreciated that the second device 135 includes the same components as shown coupled with the first device 105. Likewise, the first device 105 includes the same components as shown coupled with the second device 135. However, for the purposes of clarity, these system components are not shown in FIGS. 1 and 2. For example, the second device 135 also includes a system (such as system 100) and a computer (such as computer 110), and the first device 105 also includes media processing information (such as media processing information 140).

In one embodiment, the media processing information receiver 115 receives, at a first device 105, media processing information 140 associated with a second device 135, wherein at least one of the first and second devices, 105 and 135, respectively, is a mobile device (e.g. cell phone; tablet, personal data assistant, etc.). In some instances, one of the devices may be a non-mobile device, such as, but not limited to, a personal computer. Further, and with reference to the discussion above regarding fast and slow devices, in one instance, during the initial communication between devices, the first device 105 is the fast device and the second device 135 is the slow device. However, mid-way through a call, the second device 135 may become the fast device and the first device 105 may become the slow device 105. For example, a first device that is fast may be downloading a large volume of content, thereby slowing it considerably and lowering its available CPU usage below that of the available CPU usage of the second device 135.

In one embodiment, the media processing information 140 is an encoded media packet 205 volume. In another embodiment, the media processing information 140 is a processing time of at least one media processing component 210 of the second device 135. The central processing unit (CPU) usage is detected through monitoring the processing time of the at least one media processing component 210. The at least one media processing component 210 (and the at least one media processing component 130 of the first device 105, as is discussed below) includes at least one of, but is not limited to, the following functions: audio/video capture, pre-processing, encoding, audio/video decoding; post-processing; and playing.

Of note, the computer 110 is coupled with the system 100; it may optionally be positioned at the system 100 or at the first device 105.

The comparer 120 compares the media processing information 140 to a processing time of at least one media processing component 130 of the first device 105.

The target adjustment level determiner 125 determines a target adjustment level 145, wherein arriving at the target adjustment level 145 enables the first device 105 and the second device 135 to achieve a matching media processing quality level. By "matching", it is meant that the media processing quality level of the first device 105 is near to or exactly the same as the second device 135. As described herein, the media processing quality level is a predetermined selection of a combination of values that have been determined to lead the best user experience. For example, the values may relate, but are not limited to, the following: video frame rate; resolution; audio sampling rate; and compression level. The measurement of these values is determined from observing the media processing information 140 of the second device 135 and the processing time of the at least one media processing component 130 of the first device 105, as was described herein with reference to the comparer 120. The target adjustment level 145 is such a level that the caller and the callee (first device 105 and second device 135, respectively) have a close performance in relation to FPS (or pixel per second [pixel encoding time]), resolution, and audio quality.

Significantly, in one embodiment, the target adjustment level 145 is achieved based on the negotiation and the continuous communication (described below) between the first device 105 and the second device 135 (or between the caller and the callee, respectively). The following example is based on the assumption that it is appreciated that the first device 105 and the second device 135 may be considered, in different applications, to be the caller and the callee and vice versa. For example, the caller is holding a mobile phone having the components thereon of the first device 105, as well as the components thereon of the second device 135. Similarly, the callee is holding another mobile phone having the components thereon of the first device 105, as well as the components thereon of the second device 135. Thus, in this manner, the caller and the callee exchange information, send requests to each other and make decisions together. Therefore, in one embodiment, the exchanging and the sending of the requests to each other does not occur through one central point, but collaboratively between the first and second device, 105 and 135, respectively.

The media processing component adjuster 130 adjusts the at least one media processing component 130 of the first device 105 to meet the target adjustment level 145. In one embodiment, the media processing component adjuster 130 determines that a local quality level should be changed, through adjusting at the first device 105 at least one of, but not limited to, the following: audio/video capture; pre-processing; and encoding. Alternatively, or in addition to, the media processing component adjuster 130 determines that the quality level of the second device 135 should be changed. In one embodiment, the configuration change requester 230 requests of the second device 135 a change in the at least one media processing component 210 of the second device 135. The request is made over a network, in which the information exchange protocol is designed to be sufficiently robust under poor network conditions (e.g. high latency, high loss rate, etc.).

In one embodiment, the adjusting by the media processing component adjuster 130 optionally includes, but is not limited to, the following functions: resetting a camera configuration according to a frame rate; resetting a camera configuration according to a resolution value; fixing the camera capture configuration and achieving the target adjustment level 145 through dynamic video frame resizing and adaptive frame dropping (in particular when the resetting of the camera incurs unacceptable video glitches); resetting an audio recording frequency; resetting an audio encoding frequency; and down sampling an audio recording frequency.

Further, in one embodiment, the receiving, the comparing, the determining and the adjusting described herein occur continuously. For example, CPU usage control, in one embodiment, is based on continuous communication between the first device 105 and the second device 135 (or between the caller and the callee, respectively, in one embodiment). The term continuously refers to a substantially ongoing performance of at least one of the receiving, the comparing, the determining and the adjusting described herein. By substantially, it is meant that within the context of a continuous performance, there may be small periods of time in which none of the receiving, comparing, determining and adjusting are occurring. However, the delay between one of the receiving, comparing, determining and/or adjusting, in one embodiment, is slight, and does not limit or detract from the overall ongoing and timely adjusting capability of embodiments.

The media processing information sender 235 sends the request by the first device 105 to the second device 135 for a change in the at least one media processing component 210 of the second device 135.

The adjustment information storer 215 stores adjustment information history 225 at the adjustment information store 220. Based on this stored history, the system 100 determines for future calls to the second device 135 the initial target adjustment level 145, resulting in an immediate high quality communication between the two devices.

In one embodiment, the adjustments made by the media processing component adjuster 130 are dynamically accomplished, without the need for manual input. In another embodiment, the adjustments made by the media processing component adjuster 130 are manually guided by a user of the first mobile device 105. The final target adjustment level 145 achieved by both the first device 105 and the second device 135 is jointly constrained by the network conditions.

It should be noted that the initial quality level associated with the target adjustment level 145 may be set according to an autoconfiguration program and/or leveraging the expert knowledge of the device manufacture/model.

Figure 3:
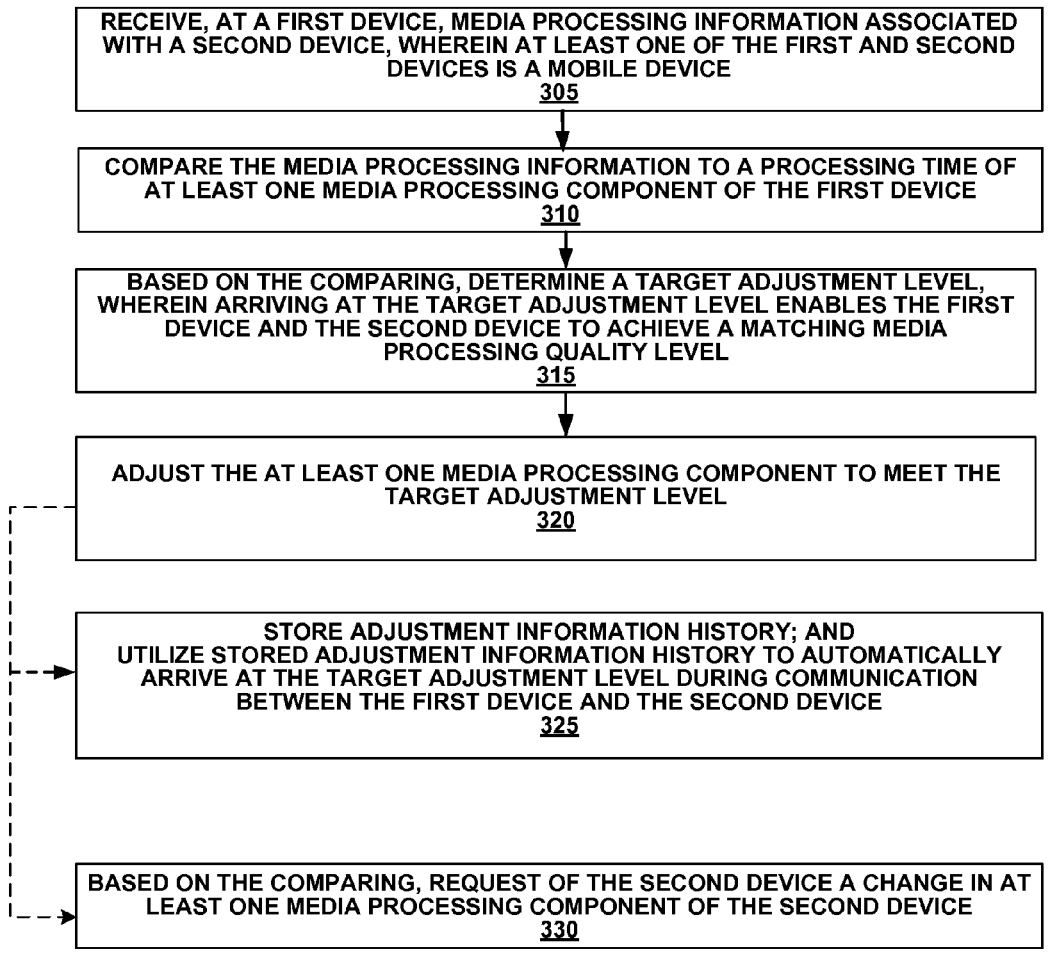
FIG. 3 shows a flow chart for performing a method for enabling communication between mobile devices, in accordance with an embodiment.

FIGS. 3 and 4 show a flow chart of an example method for enabling communication between devices, in accordance with an embodiment. In various embodiments, methods 300 and 400 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 300 and 400 are performed by first device and/or second device, 105 and 135, respectively, as described in FIGS. 1 and 2, or by systems, such as system 100 described herein, located on devices 105 and 135.

Referring now to FIGS. 1-3, at 305, in one embodiment and as discussed herein, a first device 105 receives media processing information 140 associated with a second device 135, wherein at least one of the first and second devices, 105 and 135, respectively, is a mobile device. In one embodiment and as discussed herein, the receiving 305 of the media processing information 140 optionally includes any of the following: receiving an encoded media packet volume; and receiving a processing time of the at least one media processing component 210 of the second device 135.

At 310, in one embodiment and as discussed herein, the media processing information 140 is compared to a processing time of at least one media processing component 130 of the first device 105.

At 315, in one embodiment and as discussed herein, based on the comparing at 310, a target adjustment level 145 is determined, wherein arriving at the target adjustment level enables the first device 105 and the second device 135 to achieve a matching media processing quality level.

At 320, in one embodiment and as discussed herein, the at least one media processing component 130 is adjusted to meet the target adjustment level 145. In various embodiments and as discussed herein, the adjusting of 320 optionally includes any of the following: resetting a camera configuration according to a frame rate; resetting a camera configuration according to a resolution value; resetting an audio recording frequency; and resetting an audio encoding frequency.

At 325, in one optional embodiment and as discussed herein, an adjustment information history 225 is stored, and the stored adjustment information history 225 is utilized to automatically arrive at the target adjustment level 145 during communication between the first device 105 and the second device 135.

At 330, in one optional embodiment and as discussed herein, based on the comparing at 310, a request by the first device 105 is made of the second device 135 by the media processing information sender 235 (in one embodiment) for a change in the at least one media processing component 210 of the second device 135.

FIG. 4 is a flow chart of a method for enabling communication between devices, according to an embodiment.

Referring to FIGS. 1, 2, and 4, at 405, in one embodiment and as discussed herein, the first device 105 receives media processing information 140 associated with the second device 135, wherein at least one of the first and second devices, 105 and 135, respectively, is a mobile device. In various optional embodiments, the receiving 405 includes but is not limited to the following: receiving an encoded media packet volume; and receiving a processing time of the at least one media processing component 210 of the second device 135.

At 410, in one embodiment and as discussed herein, the media processing information 140 is compared to the processing time of the at least one media processing component 130 of the first device 105.

At 415, in one embodiment and as discussed herein, based on the comparing at 410, a target adjustment level 145 is determined, wherein arriving at the target adjustment level 145 enables the first device 105 and the second device 135 to achieve a matching media processing quality level.

At 420, in one optional embodiment and as discussed herein, the at least one media processing component 130 is adjusted to meet the target adjustment level 145.

At 425, in one optional embodiment and as discussed herein, the adjustment information history 225 is stored, and the stored adjustment information history 225 is utilized to automatically arrive at the target adjustment level 145 during communication between the first device 105 and the second device 135.

At 430, in one optional embodiment and as discussed herein, based on the comparing at 410, the first device 105 requests a change in the at least one media processing component 210 of the second device 135.

Thus, embodiments recognize, determine, and balance the disparity between the communication capabilities of two different devices such that a higher quality communication is thus enabled.

All statements herein reciting principles, aspects, and embodiments of the technology as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present technology, therefore, is not intended to be limited to the embodiments shown and described herein. Rather, the scope and spirit of present technology is embodied by the appended claims.

What is claimed is:

1. A non-transitory computer readable storage medium having stored thereon, computer-executable instructions that, when executed by said computer, cause said computer to perform a method for enabling communication between devices, said method comprising:

receiving, at a first device, media processing information associated with a second device, wherein at least one of said first and second devices is a mobile device;

comparing said media processing information to a processing time of at least one media processing component of said first device;

based on said comparing, determining a target adjustment level, wherein arriving at said target adjustment level enables said first device and said second device to achieve a matching media processing quality level; and adjusting said at least one media processing component of said first device to meet said target adjustment level.

2. The non-transitory computer readable storage medium of claim 1, wherein said receiving, said comparing, said determining and said adjusting occur continuously.

3. The non-transitory computer readable storage medium of claim 1, wherein said method further comprises:

sending a request by said first device to said second device for a change in said at least one media processing component of said second device.

4. The non-transitory computer readable storage medium of claim 1, wherein said receiving said media processing information comprises:

receiving an encoded media packet.

5. The non-transitory computer readable storage medium of claim 1, wherein said receiving said media processing information comprises:

receiving a processing time of at least one media processing component of said second device.

6. The non-transitory computer readable storage medium of claim 1, wherein said method further comprises:

storing adjustment information history; and utilizing stored adjustment information history to automatically arrive at said target adjustment level during communication between said first device and said second device.

7. The non-transitory computer readable storage medium of claim 1, wherein said method further comprises:

based on said comparing, requesting of said second device a change in at least one media processing components of said second device.

8. The non-transitory computer readable storage medium of claim 1, wherein said adjusting comprises:

resetting a camera configuration according to frame rate.

9. The non-transitory computer readable storage medium of claim 1, wherein said adjusting comprises:

resetting a camera configuration according to a resolution value.

10. The non-transitory computer readable storage medium of claim 1, wherein said adjusting comprises:

resetting an audio recording frequency.

11. The non-transitory computer readable storage medium of claim 1, wherein said adjusting comprises:

resetting an audio encoding frequency.

12. A system for enabling communication between devices, said system comprising:

a media processing information receiver coupled with a computer, said media processing information receiver configured for receiving, at a first device, media processing information associated with a second device, wherein at least one of said first and second devices is a mobile device;

a comparer coupled with said computer, said comparer configured for comparing said media processing information to a processing time of at least one media processing component of said first device;

a target adjustment level determiner coupled with said computer, said target adjustment level determiner configured for determining a target adjustment level, wherein arriving at said target adjustment level enables said first device and said second device to achieve a matching media processing quality level; and a media processing component adjuster coupled with said computer, said media processing component adjuster configured for adjusting said at least one media processing component of said first device to meet said target adjustment level.

13. The system of claim 12, further comprising:

a media processing information sender coupled with said computer, said media processing information sender configured for sending a request by said first device to said second device for a change in said at least one media processing component of said second device.

14. The system of claim 12, wherein said media processing information comprises:

an encoded media packet.

15. The system of claim 12, wherein said media processing information comprises:

a processing time of at least one media processing component of said second device.

16. The system of claim 12, further comprising:

an adjustment information storer coupled with said computer, said adjustment information storer configured for storing adjustment information history at an adjustment information store.

17. The system of claim 12, further comprising:

a configuration change requester coupled with said computer, said configuration change requester configured for requesting of said second device a change in at least one media processing components of said second device.

18. A computer-implemented method for enabling communication between devices, said computer-implemented method comprising:

receiving, at a first device, media processing information associated with a second device, wherein at least one of said first and second devices is a mobile device;

comparing said media processing information to a processing time of at least one media processing component of said first device; and based on said comparing, determining a target adjustment level, wherein arriving at said target adjustment level enables said first device and said second device to achieve a matching media processing quality level.

19. The computer-implemented method of claim 18, further comprising:

adjusting said at least one media processing component of said first device to meet said target adjustment level.

20. The computer-implemented method of claim 18, wherein said receiving said media processing information comprises:

receiving an encoded media packet.

21. The computer-implemented method of claim 18, wherein said media processing information comprises:

receiving a processing time of at least one media processing component of said second device.

22. The computer-implemented method of claim 18, further comprising:

storing adjustment information history; and utilizing stored adjustment information history to automatically arrive at said target adjustment level during communication between said first device and said second device.

23. The computer-implemented method of claim 18, further comprising:
   based on said comparing, requesting of said second device a change in at least one media processing components of said second device.

* * * * *